(12) United States Patent
Frayne

(10) Patent No.: US 7,772,712 B2
(45) Date of Patent: *Aug. 10, 2010

(54) FLUID-INDUCED ENERGY CONVERTER WITH CURVED PARTS

(75) Inventor: Shawn Michael Frayne, Mountain View, CA (US)

(73) Assignee: Humdinger Wind Energy, LLC, Honolulu, HI (US)

( * ) Notice: Subject to any disclaimer, the term of this patent is extended or adjusted under 35 U.S.C. 154(b) by 408 days.

This patent is subject to a terminal disclaimer.

(21) Appl. No.: 11/849,997

(22) Filed: Sep. 4, 2007

(65) Prior Publication Data

US 2008/0297119 A1   Dec. 4, 2008

Related U.S. Application Data

(60) Provisional application No. 60/932,304, filed on May 30, 2007, provisional application No. 60/950,227, filed on Jul. 17, 2007.

(51) Int. Cl.
*F03G 7/08* (2006.01)
*F03B 13/00* (2006.01)

(52) U.S. Cl. ........................................ 290/1 R; 290/43
(58) Field of Classification Search .................... 290/43, 290/54, 1 R, 1 A
See application file for complete search history.

(56) References Cited

U.S. PATENT DOCUMENTS

| 3,686,520 A | 8/1972 | Campagnuolo |
| 3,772,541 A | 11/1973 | Campagnuolo et al. |
| 3,798,475 A | 3/1974 | Campagnuolo |
| 4,024,409 A | 5/1977 | Payne |
| 4,184,805 A | 1/1980 | Arnold |
| 4,348,594 A | 9/1982 | Lipfert |
| 4,396,852 A | 8/1983 | Hunt |
| 4,536,674 A | 8/1985 | Schmidt et al. |
| 5,223,763 A | 6/1993 | Chang |
| 5,395,592 A | 3/1995 | Bolleman et al. |

(Continued)

FOREIGN PATENT DOCUMENTS

DE     EP-A-0 977 345     2/2000

(Continued)

OTHER PUBLICATIONS

Jones, et al. Oscillating-Wing Power Generation. 3rd ASME/JSME Joint Fluids Engineering Conference. 1999;1-6.

(Continued)

*Primary Examiner*—Nicholas Ponomarenko
(74) *Attorney, Agent, or Firm*—Jeffrey Schox

(57) ABSTRACT

An energy converter for inducing membrane vibrations of a membrane when subject to a fluid flow, and converting the vibrations into another form of energy, such as electricity. The energy converter includes at least one flexible membrane, at least one electrical conductor and at least one magnetic field generator configured to apply a magnetic field to the at least one electrical conductor. One of the electrical conductor and the magnetic field generator is attached to the membrane and configured to move with the membrane. The other one of the electrical conductor and the magnetic field generator has a curved surface bending towards the membrane. When subject to a fluid flow, the membrane vibrates and creates a relative movement between the conductor and the magnetic field, which induces a current.

23 Claims, 4 Drawing Sheets

U.S. PATENT DOCUMENTS

| | | | |
|---|---|---|---|
| 5,621,264 | A | 4/1997 | Epstein et al. |
| 5,839,508 | A | 11/1998 | Tubel et al. |
| 5,955,790 | A | 9/1999 | North |
| 6,011,346 | A | 1/2000 | Buchanan et al. |
| 6,020,653 | A | 2/2000 | Woodbridge et al. |
| 6,153,944 | A | 11/2000 | Clark |
| 6,273,680 | B1 | 8/2001 | Arnold |
| 6,424,079 | B1 | 7/2002 | Carroll |
| 6,768,214 | B2 | 7/2004 | Schultz et al. |
| 6,791,205 | B2 | 9/2004 | Woodbridge |
| 6,849,963 | B2 | 2/2005 | Grinsted et al. |
| 6,864,592 | B1 | 3/2005 | Kelly |
| 7,012,340 | B2 | 3/2006 | Yi |
| 7,023,104 | B2 | 4/2006 | Kobashikawa et al. |
| 7,148,591 | B2 | 12/2006 | Mizoguchi et al. |
| 7,199,480 | B2 | 4/2007 | Fripp et al. |
| 7,208,845 | B2 | 4/2007 | Masters et al. |
| 7,224,077 | B2 | 5/2007 | Allen |
| 7,414,325 | B2 | 9/2008 | Pinkerton |
| 7,439,630 | B2 | 10/2008 | Peacock |
| 7,498,681 | B1 | 3/2009 | Kellogg et al. |
| 7,573,143 | B2 * | 8/2009 | Frayne ........................ 290/1 R |
| 2004/0051692 | A1 | 3/2004 | Hirakata et al. |
| 2005/0051323 | A1 | 3/2005 | Fripp et al. |
| 2005/0093302 | A1 | 5/2005 | Miyazaki et al. |
| 2005/0099010 | A1 | 5/2005 | Hirsch |
| 2005/0230974 | A1 | 10/2005 | Masters et al. |
| 2006/0016606 | A1 | 1/2006 | Tubel et al. |
| 2006/0064972 | A1 | 3/2006 | Allen |
| 2006/0175838 | A1 | 8/2006 | Tips |
| 2008/0129254 | A1 | 6/2008 | Frayne |
| 2009/0295163 | A1 * | 12/2009 | Frayne ........................ 290/54 |

FOREIGN PATENT DOCUMENTS

| | | |
|---|---|---|
| DE | 102 41 854 | 4/2003 |
| DE | 10241854 | 4/2003 |
| EP | 0977 345 | 2/2000 |
| JP | 2001157433 | 6/2001 |
| JP | 2006-291842 | 10/2006 |
| RU | 1798866 | 2/1993 |
| WO | WO 03/001657 | 1/2003 |
| WO | WO2008151008 | 12/2008 |

OTHER PUBLICATIONS

McKinney, et al. The Wingmill: An Oscillating-Wing Windmill. J. Energy. 1981;5(2): 109-115.

Shahrzad, et al. Limit Cycle Flutter of Airfoils in Steady and Unsteady Flows. Journal of Sound and Vibration. 2002;256(2):213-225.

Sharp, P. Proposed Fluttermill Semi-Random Flutter. 2007.

Sharp, P. Proposed Fluttermill, Ganged Blades. 2007.

Sharp, P. The Fluttermill Jun. 2007;1-6.

Shimizu, et al. Multiobjective Design Study of a Flapping Wing Power Generator. Journal of Fluids Engineering. Feb. 2008;(130): 021104-1-021104-8.

Frayne. U.S. Appl. No. 11/849,988, entitled "Energy Converters Utilizing Fluid-Induced Oscillations," filed on Sep. 4, 2007 (WSGR Reference No. 36412-703.201).

Makoto Mizuno and Derek G. Chetwynd, "Investigation of a Resonance Microgenerator", Journal of Micromechancis & Microengineering, Institute of Physics Publishing, Bristol, GB, vol. 13, No. 2, Mar. 1, 2003, pp. 209-216.

J. Energy, McKinney, et.al, The Wingmill: An Oscillating-Wing Windmill, 5(2) p. 109-115, 1981.

3rd ASME/JSME Joint Fluids Engineering Conference, Jones, et.al, Oscillating-Wing Power Generation, p. 1-6, 1999.

Journal of Sound and Vibration, Shahrzad, et.al, Limit Cycle Flutter of Airfoils in Steady and Unsteady Flows, 256(2): 213-225, 2002.

Sharp, P., Proposed Fluttermill Semi-Random Flutter, 0, 2007.

Sharp, P., Proposed Fluttermill. Ganged, 0, 2007.

Journal of Micromechanics and Microengineering, Institute of Physics Pubishing, Makoto Mizuno et.al, Investigation of a resonance microgenerator, vol. 13, No. 2, pp. 209-216, Mar. 2003, Bristol, GB.

Sharp, P., The Flutter Mill, p. 1-6, Jun. 2007.

Journal of Fluids Engineering, Shimizu, et.al, Multiobjective Design Study of a Flapping Wing Power Generator, (130): 021104-1-021104-8, Feb. 2008.

* cited by examiner

FLUID-INDUCED ENERGY CONVERTER WITH CURVED PARTS

RELATED APPLICATIONS

This application relates to U.S. patent application Ser. No. 11/566,127, filed Dec. 1, 2006 and titled "GENERATOR UTILIZING FLUID-INDUCED OSCILLATIONS," and to U.S. patent application Ser. No. 11/849988, entitled "ENERGY CONVERTERS UTILIZING FLUID-INDUCED OSCILLATIONS" and filed concurrently herewith; and claims the benefits of priority from U.S. Provisional Patent Application No. 60/932,304, filed May 30, 2007, entitled "GENERATOR UTILIZING FLUID-INDUCED OSCILLATIONS," and from U.S. Provisional Patent Application No. 60/950,227, filed Jul. 17, 2007 and entitled "GENERATOR AND CIRCUIT UTILIZING FLUID-INDUCED OSCILLATIONS," the disclosures of which are incorporated herein by reference in their entireties.

FILED OF DISCLOSURE

This application generally relates to techniques of harvesting energy from flowing fluids, such as air, water, etc., and more specifically, to unique designs and structures of energy converters that convert kinetic energies embedded in the flowing fluids to other types of energy, such as electricity, by promoting and utilizing oscillations induced by flowing fluids.

BACKGROUND AND SUMMARY

This disclosure describes various embodiments of novel energy converters, such as electrical generators, that effectively promote oscillations induced by flowing fluids, and utilize the oscillations in generating electricity or other types of energy by converting energy present in fluid flows, such as airflows, water flows, tides, etc. In one aspect, an exemplary generator harnesses the kinetic energy of fluid flows by way of aeroelastic flutter induced along a tensioned membrane fixed at two or more points.

An exemplary energy converter includes at least one magnetic field generator, at least one electrical conductor, and at least one flexible membrane. Each flexible membrane has at least two fixed ends and vibrates when subject to a fluid flow. As used herein, the term "flexible membrane" as used herein refers to a flexible material capable of morphing into a large variety of determinate and indeterminate shapes in response to the action of an applied force.

According to one embodiment, the at least one magnetic field generator may be implemented as permanent magnets attached to, and move with, the membrane. For instance, one or more magnets are integrated into or onto either side or both sides of the oscillating membrane. The at least one electrical conductor is disposed in proximity to the membrane and the at least one magnetic field generator, and has a curved or contoured surface bending substantially toward the membrane. The electrical conductor may be implemented as a single piece or a combination of multiple sets of conductors, using electrical conducting materials, such as aluminum or copper coils, of various geometries. A variation of the arrangement of the magnets and the electrical conductors may be attaching or affixing the electrical conductors to the membrane, and suspending in proximity to corresponding magnetic field generators.

The flowing fluid induces a spontaneous instability in the tensioned membrane known as aeroelastic flutter, or simply "flutter". The flutter of the membrane results in a high energy oscillation mode, with a reduced torsion oscillation near the magnets nearer the ends of the membrane. Additionally, vortices shedding may occur along the edges and surface of the membrane, in some cases enhancing the oscillation.

The vibration of the membrane induced by the fluid flow causes a relative movement between the at least one electrical conductor and the applied magnetic field. The relative movement causes a change in the strength of the magnetic field applied to the electrical conductor, which induces a current flowing in the conductor.

This electric generator operates at a variety of fluid flow speeds, including lower speeds than required for most turbine-based generators. Moreover, the cost of an exemplary generator of this disclosure is substantially lower than most other fluid-flow harvesting generators. The absence of physically grinding parts offers the possibility of long, quiet, maintenance-free operation. No leading bluff bodies are required to initiate or sustain oscillation, although they can be employed if desired.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

FIG. 1b is a side view of the exemplary generator shown in FIG. 1a.

DETAILED DESCRIPTION OF ILLUSTRATIVE EMBODIMENTS

In the following description, for the purposes of explanation, numerous specific details are set forth in order to provide a thorough understanding of the present disclosure. It will be apparent, however, to one skilled in the art that the present disclosure may be practiced without the se specific details. In other instances, well known structures and devices are shown in block diagram form in order to avoid unnecessarily obscuring this disclosure.

Figure 1A:
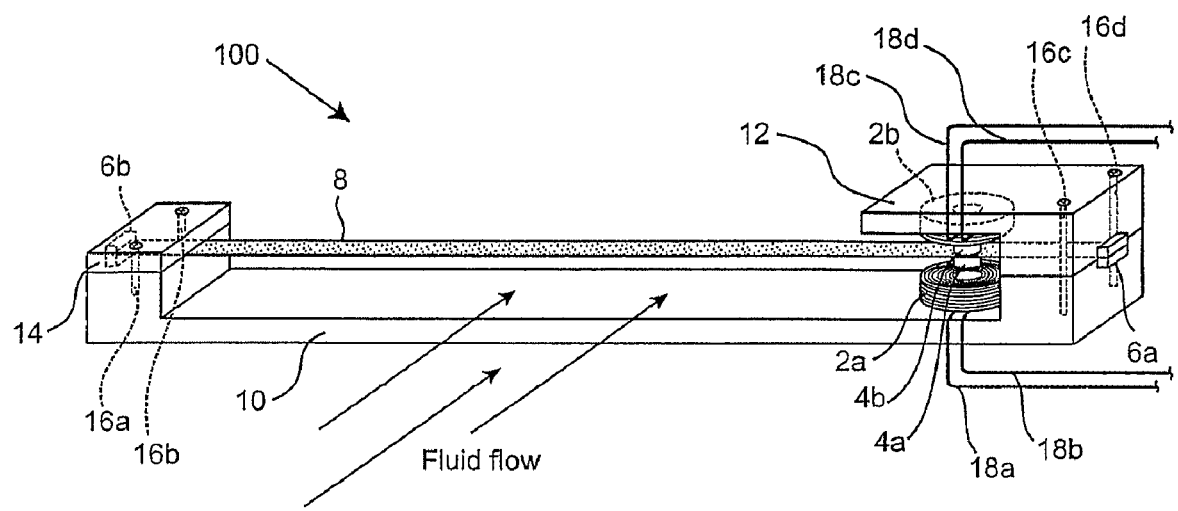
FIG. 1a is a perspective view of an exemplary generator according to this disclosure.

FIG. 1a depicts an exemplary generator 100 according to this disclosure. The generator 100 includes a supporting structure and an elongated membrane 8. The supporting structure comprises a supporting base 10 and two supporting structure clamps 12 and 14. As used herein, the term "supporting structure" is defined as any structure that has sufficient strength to support at least one affixed membrane. The supporting structure may be of any material, type, shape, and may be manmade or natural.

The membrane 8 is made from a flexible material, such as ripstock nylon, super thin polyester film, mylar-coated taffeta, Kevlar tapes, or polyethylene film, etc. The membrane 8 has two main surfaces on opposite sides and two thin edges. In this disclosure, a surface plane of a membrane is defined as a plane on which one of the main or largest surfaces is disposed. Magnetic field generators, such as permanent magnets 4a, 4b, are affixed to both main surfaces of the membrane 8, respectively. More or less magnets and/or conducting coils may be employed to achieve desired cost and power efficiencies. It is also understood that magnets with various polarization orientations may be used, such as axially magnetized magnets, diametrically-magnetized magnets, magnets with both diametrically-oriented and axially-oriented poles, etc.

Two electrical conductors, such as coils 2a, 2b, are attached to the supporting base 10 and supporting clamp 12, and suspended over the magnets 4a, 4b, respectively. The coils may be affixed to the supporting base 10 and/or the clamp 12 at various orientations relative to the magnets 4a, 4b. As used in this disclosure, a coil can be a single coil or a plurality of coils, of the same or different shapes, materials or sizes.

Tensioning devices, such as membrane anchors sets 6a, 6b, are provided to maintain tension of the membrane 8 when the membrane 8 is attached to the supporting structure. As shown in FIG. 1a, the anchor sets 6a, 6b are attached near both ends of the membrane 8 at a specific separating distance, for applying a tensioning force to the membrane 8. It is understood that other devices known to people skilled in the art, such as screws, adhesives, clamps, wires, strings, hooks, staples, nails, etc., may be used to implant the tensioning device for applying a tensioning force to the membrane 8. For instance, the membrane 8 may be clamped between the supporting base 10 and supporting structure clamps 6a, 6b, to provide the needed tensioning force.

Leads 18a-18d are coupled to coil 2a and 2b, respectively. The tension force applied to the membrane 8 is a function of the elasticity of the membrane and the physical characteristics of the supporting structure, along with the particular distance between the ends of the supporting structure relative to the distance between the anchor sets 6a and 6b.

The exemplary generator 100 shown in FIG. 1 operates as follows. A flow of fluid include liquid flows traveling across the elongated and tensioned membrane 8. Examples of fluid flows may include flowing water or a flow of air like that found in artificial ventilation systems or in natural wind. The fluid flow travels in a direction ranging from 0 to 180 degrees relative to the major axis of the membrane 8, with perpendicular flow (e.g. 90 degree to the major membrane axis along the surface planes of the membrane 8) giving approximately the most energetic oscillation. Fluid may flow from either side of the generator 100. One example of this fluid flow is indicated by three arrows in FIG. 1. The fluid flow initiates a self-exciting instability (e.g., flutter) in the membrane 8 which is enhanced through a positive feedback loop of competing fluid deflection and membrane tension forces, until an approximately constant oscillation state is achieved. The majority of the membrane 8, such as the middle section, undergoes a combination of moderate torsional (e.g., slight back-and-forth rotation along the major axis of the membrane 8) and "rising and falling" travel (the profile of the "rising and falling" travel of the membrane 8 is depicted in FIG. 1c), which is recognizable as a "flutter" oscillation. The generator 100 translates the torsional and "rising and falling" movements of the membrane 8 into a reduced torsion oscillation at the location of the magnets 4a, 4b on the membrane 8. A more highly torsional, less linear oscillation of the magnets 4a, 4b is achievable utilizing the same construction of generator 100, requiring only a slight alteration to the tensioning of the membrane 8 and placement of the magnets 4a, 4b. In one embodiment, the magnets may be compelled into a slight arched, reduced torsion (relative to the major axis of the membrane) oscillation via the flutter effect of the membrane 8.

Figure 1B:
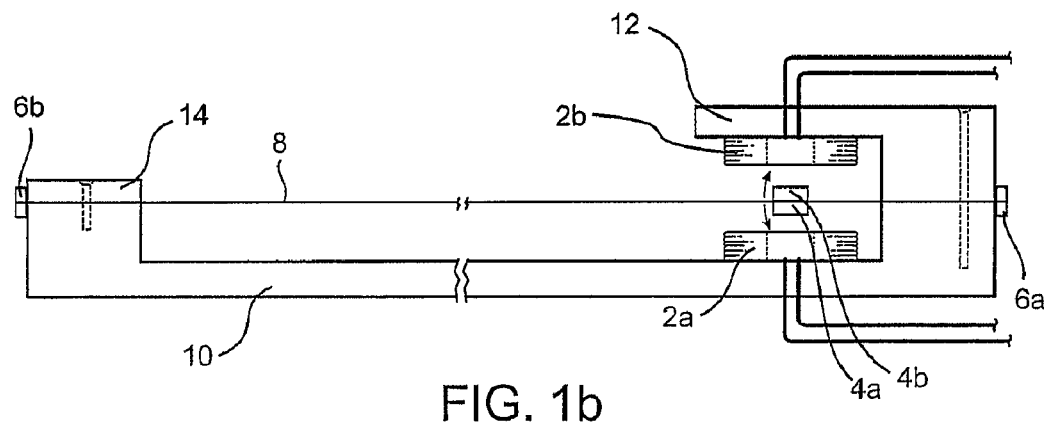
Figure 1C:
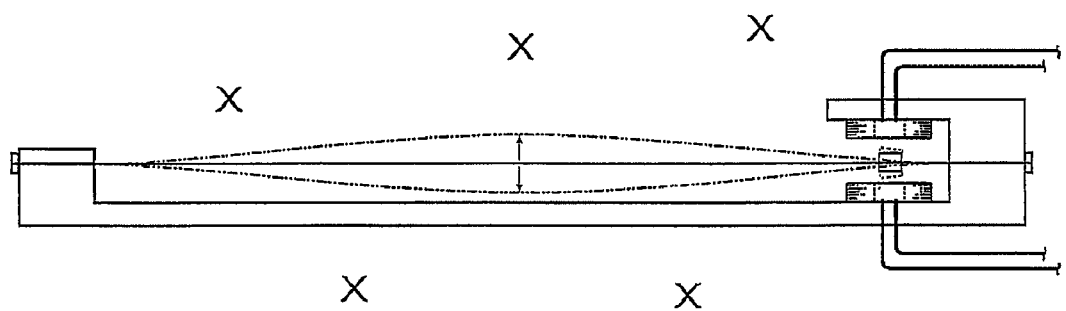
FIG. 1c is a side view of the exemplary generator shown with examples of airflow and membrane oscillation profile.

FIGS. 1b and 1c depict an oscillation where the magnets 4a, 4b and the end of the membrane 8 on which the magnets are placed move in a reduced torsion, slightly arched path, with small arrows indicating the movement of the magnets 4a, 4b on the membrane 8. This reduced torsion oscillation of the magnets 4a, 4b creates a changing magnetic field through the closed area of the coils 2a, 2b, with the magnetic fields oriented such that an electromotive force (EMF) is established in the conductive material of the coils 4a, 4b. The EMF creates a current, i.e., a flow of electrons, dependent on the load conditions, internal resistance, impedance, and a range of other factors. As applies to electrical generators of any sort, this fundamental arrangement of a changing magnetic field relative to a coil of electrical conductive material follows the physical rules originally described by Michael Faraday. The generator 100 has significant advantages over conventional generators in that no sliding contacts, gears, axles or physically grinding parts are required to generate an electrical flow.

In the oscillation mode shown in FIG. 1b, the magnets 4a, 4b oscillate approximately in phase with each other. The electricity flowing through respective leads 18a-d may therefore be combined without significant destructive interference. The leads 18a-d may be joined in parallel or series, depending on the desired voltages and currents fed into a power conditioning circuit associated with the generator 100.

The configuration shown in FIG. 1a, and further clarified in FIG. 1b, is designed to move a substantial mass (e.g., the magnets) at high frequency, with some displacement. At its most fundamental level, the generator 100 can be modeled as a simple machine that achieves a mechanical advantage in a manner akin to the way in which a lever converts a large translated motion with little force into a smaller motion with a greater potential force. This greater force near the ends of the membrane 8 allows for the high frequency oscillation of the substantial mass of the magnets 4a, 4b, even in low speed fluid flows. By achieving higher frequency oscillation, less magnetic field generating material (e.g., smaller magnets) could be used to achieve efficient conversion of the kinetic energy of the fluid flow into electricity, which translates into less expensive generators. Additionally, by placing the magnets 4a, 4b largely out of the path of the flowing fluid, the majority of the mid-section of the membrane can respond to those flows without impediment.

As shown in FIG. 1a, the membrane 8 is disposed between the clamps 12, 14 and the supporting base 10. The clamps 12 and 14 may be fixed to the supporting base 10 by any affixing means, such as by adhesive or mechanical fasteners like bolts with nuts or screws, as well as via many other well-understood options. In FIG. 1a, screws 16a-d are fed into tapped holes in the supporting base 10. Other fastening devices, such as a thread-less through-hole extending the entire thickness of the structure 10, could be employed, with corresponding bolts and nuts applied.

The anchor sets 6a, 6b are affixed to the membrane 8 through any kinds of affixing means. In one embodiment, the anchor sets 6a, 6b are adhered to the membrane 8 with adhesive. These anchor sets 6a, 6b are separated by a pre-defined distance. This pre-defined distance relative to the overall length of the supporting base 10 establishes a particular tension of the membrane 8.

While the example illustrated in FIG. 1a utilizes a structure in which coils 2a, 2b are disposed above the two surface lanes of the membrane 8, a variation of the embodiment may dispose the coils 2a, 2b laterally alongside the magnets 4a, 4b, along the edges of the membrane 8. In this case, diametrically-magnetized magnets or appropriately shaped axially-magnetized magnets may be employed. The magnetic fields would project more significantly in the lateral direction, cutting across the coils disposed by the edges of the membrane 8, as the magnet oscillates. This structure is advantageous in that side-mounted coils would not impede the greater membrane displacement that may intermittently occur. More than one set of coils may be side-mounted to take advantage of increased displacement of the membrane-mounted magnets in more powerful fluid flows. For large generators or generators subjected to highly variable fluid flow, one or more axially-magnetized magnets of various geometries can be combined with one or more side-mounted coils. The side-mounted coils may employ air cores and/or ferromagnetic cores, so as to make more efficient use of the flux projected by the magnets. Also, various coil windings can be employed (e.g., wave winding).

In another variation, magnets with multiple diametrically-oriented and axially-oriented poles are used. Corresponding coils can then be arranged to capture the flux produced when such magnet oscillates with the membrane 8. The exact locations for the corresponding coils may be determined empirically or with the aid of electromagnetic modeling software.

Figure 2A:
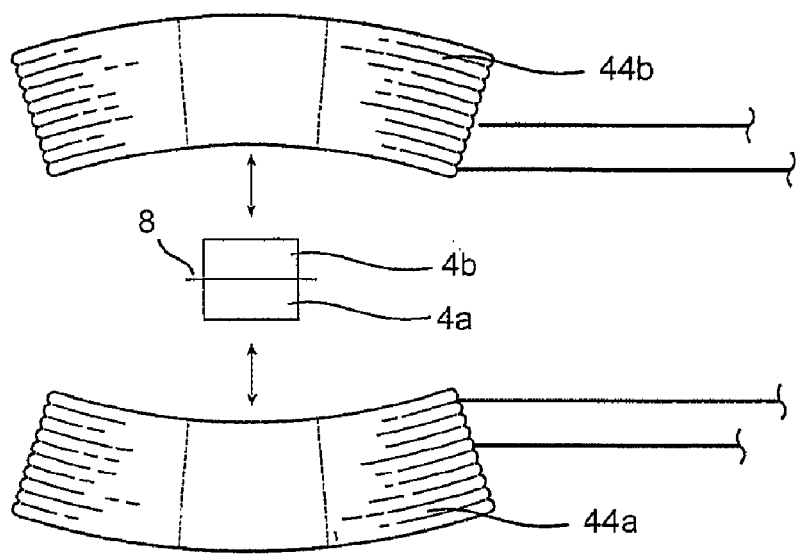
FIGS. 2a-2b show exemplary arrangements of electrically conductive coils and magnets.
Figure 2B:
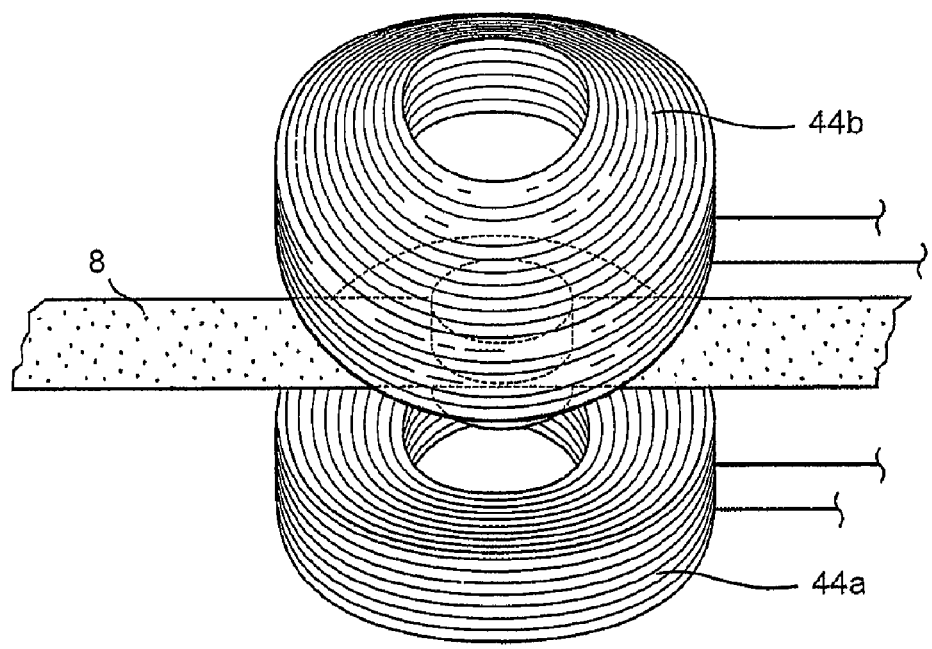

FIGS. 2a and 2b depict an embodiment of a unique arrangement of magnetic field generators and electrical conductors. Each of coils 44a, 44b includes an curved or contoured surface bending toward the membrane 8, for better capturing the changing magnetic flux of the oscillating magnets 4a, 4b. In one embodiment, the coils 44a, 44b have a bent or contoured toroid structure. It is understood that coils with other shapes, types, materials or sizes may be used.

Similarly, in an embodiment where electrical conductors, such as coils, are attached to the membrane, and magnets are suspended over the coils, the magnets may assume a shape having an inward-bending or inward curving surface toward the membrane.

Figure 3A:
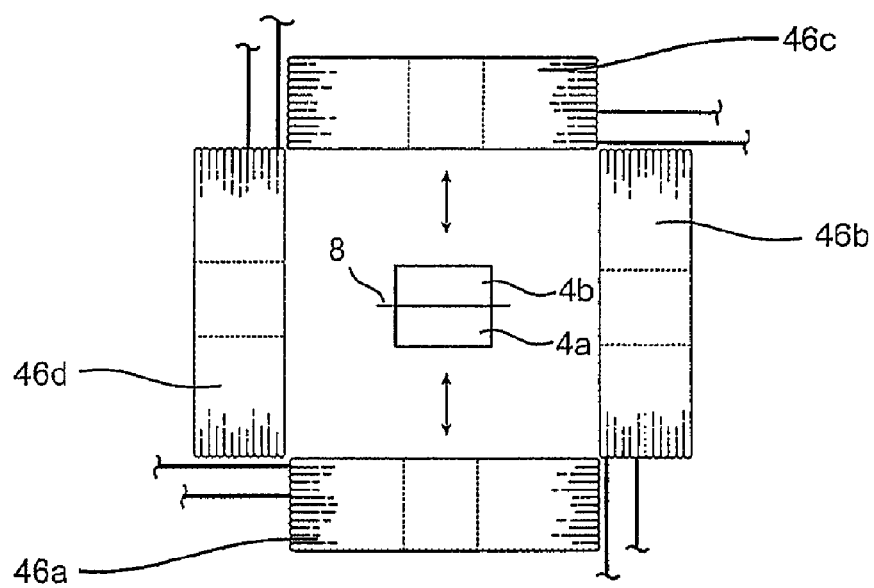
FIGS. 3a-3b show additional exemplary arrangements of electrically conductive coils and magnets.
Figure 3B:
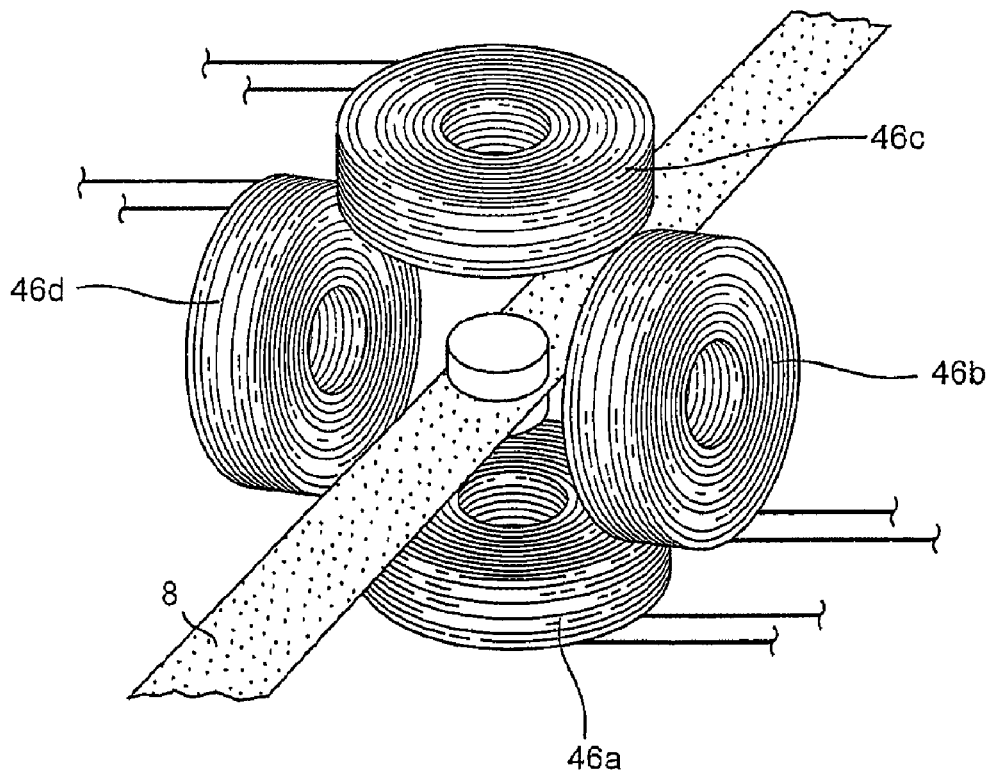

FIGS. 3a and 3b depict another exemplary arrangement of magnetic field generators and electrical conductors. A plurality of coils 46a-46d are disposed around the membrane 8 and magnets 4a, 4b. Coils 46a, 46c are disposed above the surface planes of the membrane 8, and coils 46b, 46d are disposed over two edges of the membrane 8 and having surfaces facing the edges of the membrane 8. If the magnets are of a substantial thickness, or of an appropriate magnetization orientation (e.g., either axial or diametric), a considerable amount of magnetic flux is directed perpendicular to the travel path of the magnets. A greater percentage of this flux may also be directed through said coils if ferromagnetic cores are disposed within, behind, or in proximity to the coils, as has been mentioned in other sections of this disclosure. This laterally-projecting changing flux can be captured by coils 46b and 46d, making for a more efficient generator. Coils 46a-46d may have the same size, type or shape, or different sizes, types or shapes. In addition, coils 46a-46d may have a inward-bending or inward-curving surface toward the membrane 8, such those the type shown in FIG. 2a.

It is understood that the same concept can be applied to an embodiment in which electrical conductors, such as coils, are attached to the membrane. In this case, magnets may be disposed both above and lateral to a surface plane of the membrane on which the electrical conductor is disposed.

Figure 4A:
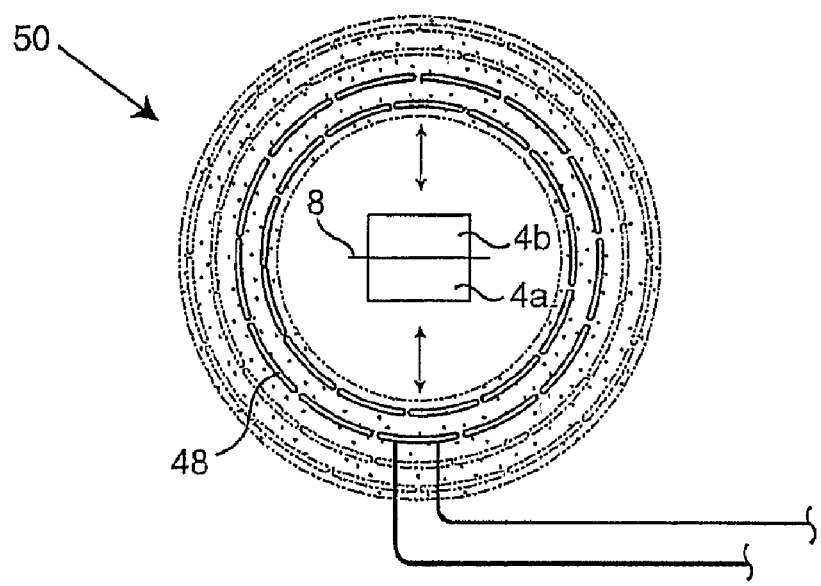
FIGS. 4a-4b are side views of further exemplary arrangements of electrically conductive coils and magnets.
Figure 4B:
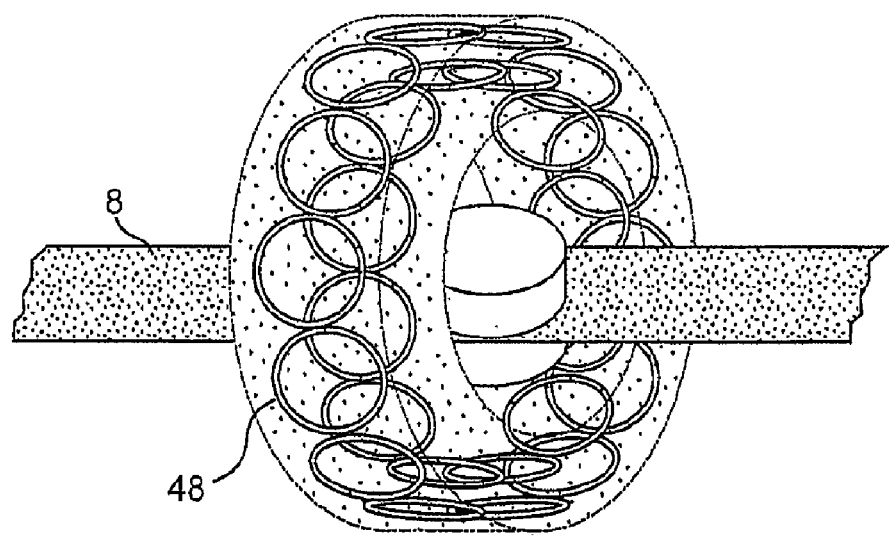

FIGS. 4a and 4b depict still another embodiment in which an electrical conductor surrounds or substantially surrounds the membrane on which the magnetic field generator is disposed. As shown in FIG. 4a, multiple coils 48 are disposed in a manner having an inward-bending surface facing towards the magnets 4a, 4b, while overlapping one another. FIG. 4b depicts further aspects of the structure shown in FIG. 4a, with the multiple coils and conductive wiring connections being omitted for clarity. As shown in FIG. 4b, the coil structure 50 is a multiplicity of inward facing toroids or coils that collectively form a novel coil structure. It is understood that the electrical conductor may only substantially surround the membrane, with one or more gaps. This structure is designed to capture a great portion of the changing flux emitted by a magnetic field generator, such as a permanent magnet, when that magnetic field generator moves in an approximately linear fashion.

The same concept may be applied to an embodiment where electrical conductors, such as coils, are attached to the membrane. Magnets may surround or substantially surround the membrane on which the electrical conductors are disposed.

Air-core type coils are suitable for implementation in generators described in this disclosure, to avoid "cogging" or generator stalling that is generally caused by heavily ferromagnetic cores. However, coils with ferromagnetic cores may also be used; in certain cases these coils with cores will yield improved electrical power generation. For instance, in the embodiments illustrated in FIGS. 2-4, the cogging" or generator stalling caused by heavily ferromagnetic cores can be mitigated by an even distribution of coil material. The cores may be filled with a ferromagnetic material (e.g., iron, laminated steel, nickel, mumetal) to increase magnetic flux that is channeled through the coil cores without overly restrictive cogging.

Another useful aspect, particularly pertaining to coils with ferromagnetic cores, involves membrane dampening using a back-EMF through a set of conductive coils. If a set of side-mounted coils, preferably with ferromagnetic cores, such as 46b,d as depicted in FIG. 3b, are connected in a parallel circuit configuration (when a current is flowing), the oscillation of the magnetic field generator mounted on the membrane 8 may be reduced by altering the configuration of that parallel connection. This is useful for the following scenario: In fluid flow speeds of up to 30 mph, a generator of the sort described herein may safely output electrical power through two coils connected in parallel, with constructive current flows. However, in higher fluid flow speeds, certain embodiments of these generators may be in danger of being damaged. In those situations, the connections between the coils can be switched, by a relay or similar means, so that the current flows through the two coils is in opposition. In other words, as the magnetic field generator moves across the face of coil 46d, a flow of electrical current is produced which then flows into coil 46b. This current flow in coil 46b produces a magnetic field which, in conjunction with the current flow in coil 46d, dampens the oscillation of the magnetic field generator mounted on the membrane 8.

In other situations, it may be advantageous to capture the substantially greater energy available in higher fluid flow speeds. However, the oscillation of the membrane 8 may also preferably be dampened in these higher flow speeds, so as to prevent damage. By increasing the load presented to the generator, such as by attaching an ultracapacitor, when fluid flows increase in speed, the additional energy available in these situations may be captured and the oscillation of the membrane 8 similar dampened, by way of an increased back-EMF through the coils. This technique is similar to that employed in regenerative breaking in hybrid vehicles, wherein a rotational oscillation of a wheel is dampened by overloading a generator attached to said wheel with a capacitor. The energy that comes from that overloading is then captured by the capacitor and subsequently used to charge a battery bank. However, while this technique is known in the field of rotating systems, it has thus far been unexplored in membrane-based generators of the sort first described in this disclosure.

Various types of supporting structures or mounting means may be used to implement the generators according to this disclosure. For example, instead of utilizing a rigid, stationary structure to hold the membrane under tension, an mobile, aerial floating or lifting device, such as a kite or balloon, can hold a membrane under tension. In this embodiment, the buoyancy and wind acting against the balloon, kite, or other aerial floating or lifting structure provide a tensioning on the membrane 8, one end of which may be attached to the ground or to be held taut between cables or straps attached to the ground and the aerial structure. According to one embodiment, a generator according to this disclosure, such as that shown in FIG. 1a, is attached to an aerial floating or lifting device like a balloon or kite, to allow the generator access to the higher wind speeds at great altitudes without the expense of a tall mounting tower.

It should also be noted that the membrane and the mounting structure should not be treated as completely independent from one another. Indeed, the oscillation of the membrane of these various embodiments also excites frequencies of oscillation in the mounting structure that houses said oscillating membrane. In a manner similar to the sustained and powerful vibrations of a fine stringed musical instrument, such as a violin or a guitar, the oscillation of the membrane may be enhanced by choosing appropriate materials and geometries of the mounting structure. Also, the oscillation of the membrane may be enhanced or dampened by isolating or securely joining the mounting structure to a grounded base, depending on the natural resonance of that grounded base. Resonating cavities molded into the mounting structure itself may also enhance the vibration of the membrane as well.

It is understood that variations of the embodiments described in this disclosure may be achieved by switching the locations and/or structures of the magnets and coils. For instance, one or more magnets may be attached to a membrane having one or more coils suspended over the magnets; and conversely, one or more coils may be affixed to a membrane having at least one magnet suspended over the coils.

Generators implemented according to this disclosure may be used to power flying vehicles, such as ultra-light, human-carrying planes or autonomous flying devices. The drafts and airflows present at higher altitudes can be captured by a plane-mounted generator of the sort disclosed herein, charging up a battery or capacitor bank to energize a propeller system.

Certain dimensional parameters, such as dimensions of the membrane 8 and the placement and geometry of the magnets 4a, 4b, are found useful in building an efficient generator. It has been noted that a length-to-width ratio of the membrane 8 of approximately 40:1 is beneficial in establishing a highly energetic flutter oscillation. Ratios ranging from 30:1 to 1000:1 also make for effective, efficient generators. The magnets may assume various shapes, such as disk-shaped or rectangular, having a width or diameter approximately equal or less than the width of the membrane, although exceptions apply. Furthermore, placing the center of the magnets near one end of the membrane, at a distance of between $1/100^{th}$ to $1/10^{th}$ of the entire length of the membrane is useful in converting a flutter oscillation into a reduced torsional arched oscillation of the magnets.

According to one embodiment utilizing the configuration illustrated in FIG. 1a, the membrane 8 has an elongated shape having two fixed ends. The membrane is made of slit taffeta with mylar coating, and the length of the membrane between the inner clamping edges of the supporting base 10 is 455 mm long. The membrane 8 is 11 mm wide and 0.1-0.15 mm thick. The centers of two magnets 4a, 4b are adhered to the surfaces of the membrane at 15 mm from one fixed end. The magnets 4a, 4b are affixed to both surfaces of the membrane 8, concentric with each other. The magnets 4a, 4b are of the NdFeB type, with a disk shape of 10 mm in diameter, 2 mm thick, with surface field of 2450 Gauss, and a weight of 1.17 g each. Two electrical conductive coils are affixed to the supporting base 10 and the clamp 12 with the coil opening in an approximately parallel plane to the surface of the membrane 8. The coils are made of 30 awg enamel coated copper wire, each with approximately 735 turns and having a resistance of approximately 16-18 ohms. The coils are approximately 12 mm inner diameter, and 30 mm outer diameter. These coils are wired in series to achieve a total resistance of approximately 32-36 ohms. The base is made of extruded aluminum. The vertical oscillation of the membrane, peak to peak, is approximately 20 mm. This embodiment generates approximately 35-40 mW across a matched load, in a 9-12 mph wind (4-5.3 m/s), sufficient for powering a wireless transceiver for continuous RF transmission of information, such as temperature and voltage, charging capacitors in the wireless transceiver, powering white LEDs, charging Li-ion batteries, charging cell phones, and operating motors.

The embodiment described in FIG. 1 also performs at a similar level of efficiency at larger scales. To take one operating example, the length of the membrane between the inner clamping edges of the supporting structure 10 is 1.295 meters long. The membrane in this particular embodiment is 14 mm wide and 0.1-0.15 mm thick. The centers of two magnets 4a, 4b are adhered to the membrane at 31.5 mm from one fixed end. The magnets are affixed to both surfaces of the membrane, concentric with each other. The magnets are of the NdFeB variety, with a disk shape of 12.7 mm diameter, 3.1 mm thick. Two electrical conductive coils are affixed to the supporting structure 10 and the clamp 12 with the coil opening in an approximately parallel plane to the surface of the membrane 8. The vertical oscillation of the membrane, peak to peak, is approximately 20 mm in a 9 mph wind (4 m/s). Similar power production efficiencies are produced by such a generator, relative to the smaller generator embodiment previously described in detail. This particular generator variation also benefits from additionally or exclusively side-mounted coils; moreover, the addition of core materials (e.g., a ferromagnetic material, such as iron) to the inside and/or along the backing of the coils may enhance the electrical output, and allow for generator operation in a wider variety of fluid flow speeds.

This disclosure has been described with reference to specific embodiments thereof. It will, however, be evident that various modifications and changes may be made thereto without departing from the broader spirit and scope of the disclosure. The concepts described in the disclosure can apply to various operations of the networked presentation system without departing from the concepts. The specification and drawings are, accordingly, to be regarded in an illustrative rather than a restrictive sense.

What is claimed is:

1. An electrical generator comprising:
a flexible membrane having at least two fixed ends, wherein the membrane vibrates when subject to a fluid flow;
at least one electrical conductor and at least one magnetic field generator configured to apply a magnetic field to the at least one electrical conductor, wherein one of the at least one electrical conductor and the at least one magnetic field generator is attached to the membrane and configured to move with the membrane, and the other one of the at least one electrical conductor and the at least one magnetic field generator has a surface bending toward the membrane;
wherein the vibration of the membrane caused by the fluid flow creates a relative movement between the at least one conductor and the magnetic field generated by the at least one magnetic field generator; and
whereby the relative movement creates a change in the strength of the magnetic field applied to the at least one electrical conductor; and
the change in the strength of the magnetic field induces a current.

2. The generator of claim 1, wherein the at least one magnetic filed generator is attached to the membrane.

3. The generator of claim 2, wherein:
the at least one electrical conductor includes two sets of electrical conductor; and
each set of the electrical conductor is disposed over a respective surface plane of the membrane, and has a surface bending toward the membrane.

4. The generator of claim 2, wherein:
the at least one electrical conductor includes two sets of electrical conductor; and
each set of the electrical conductor is disposed substantially lateral to a respective edge of the membrane, and has a surface bending toward the membrane.

5. The generator of claim 2, wherein:
the at least one electrical conductor includes four sets of electrical conductor;
two sets of the electrical conductor disposed over the surface planes of the membrane; and
the other two sets of the electrical conductor are disposed over the edge of the membrane.

6. The generator of claim 5, wherein:
each of the two sets of electrical conductor disposed over the surface planes of the membrane has a surface bending toward the membrane; and
each of the two sets of electrical conductor disposed over the edges of the membrane has a surface bending towards the membrane.

7. The generator of claim 5, wherein set of the electrical conductor has a toroid structure.

8. The generator of claim 2, wherein the at least one electrical conductor surrounds or substantially surrounds the membrane.

9. The generator of claim 8, wherein the at least one electrical conductor includes multiple layers, each layer includes at least one electrical conductor.

10. The generator of claim 9, wherein each layer of the at least one electrical conductor includes multiple coil sets, and each coil set includes a surface bending toward the membrane.

11. The generator of claim 1, wherein the at least one electrical conductor is attached to the membrane.

12. The generator of claim 11, wherein:
the at least one magnetic field generator includes two magnetic field generators; and
each of the magnetic field generators is disposed over a respective surface plane of the membrane, and has a surface bending toward the membrane.

13. The generator of claim 11, wherein:
the at least one magnetic field generator includes two magnetic field generators; and
each of the magnetic field generators is disposed substantially lateral to a respective edge of the membrane, and has a surface bending toward the membrane.

14. The generator of claim 11, wherein:
the at least one the magnetic field generator includes four magnetic field generators;
two of the magnetic field generators disposed over the surface planes of the membrane; and
the other two of the magnetic field generators are disposed over the edge of the membrane.

15. The generator of claim 14, wherein:
each of the two magnetic field generators disposed over the surface planes of the membrane has a surface bending towards the membrane; and
each of the two magnetic field generators disposed over the edges of the membrane has a surface bending towards the membrane.

16. The generator of claim 2, wherein the at least one magnetic field generator surrounds or substantially surrounds the membrane.

17. The generator of claim 16, wherein the magnetic field generator includes multiple layers, each layer includes at least one magnetic field generators.

18. The generator of claim 17, wherein each layer includes multiple magnetic field generators, and each magnetic field generator includes a surface bending toward the membrane.

19. An electrical generator comprising:
flexible vibrating means for vibrating when subject to a fluid flow, wherein the vibrating means has at least two fixed ends;
electrical conducting means for conducting electricity;
means for generating a magnetic field applied to the electrical conducting means;
wherein:
one of the electrical conducting means and the magnetic field generating means is attached to the vibrating means and configured to move with the vibrating means, the other one of electrical conducting means and the magnetic field generating means has a surface bending toward the membrane; and
the other one of the electrical conducting means and the magnetic field generating means has a surface bending toward the membrane; and
the vibration of the vibrating means caused by the fluid flow creates a relative movement between the electrical conducting means and the magnetic field; and
whereby the relative movement creates a change in the strength of the magnetic field applied to the electrical conducting means; and
the change in the strength of the magnetic field induces a current.

20. The generator of claim 19, wherein the at least one electrical conducting means is attached to the vibrating means.

21. The generator of claim 20, wherein the electrical conducting means surrounds or substantially surrounds the vibrating means.

22. The generator of claim 21 wherein:
the electrical conducting means includes multiple layers,
each layer of the electrical conducting means includes multiple coil sets, and
each coil set includes a surface bending toward the membrane.

23. An electrical generator comprising:
a flexible membrane having at least two fixed ends, wherein the membrane vibrates when subject to a fluid flow;
at least one electrical conductor and at least one magnetic field generator configured to apply a magnetic field to the at least one electrical conductor;
wherein:
one of the at least one electrical conductor and the at least one magnetic field generator is disposed on a surface plane of the membrane and configured to move with the membrane, and the other one of the at least one electrical conductor and the at least one magnetic field generator has a first surface facing the surface plane of the membrane and a second surface an edge of the membrane; and
the vibration of the membrane caused by the fluid flow creates a relative movement between the at least one conductor and the magnetic field generated by the at least one magnetic field generator;
whereby the relative movement creates a change in the strength of the magnetic field applied to the at least one electrical conductor; and
the change in the strength of the magnetic field induces a current.

* * * * *